(12) United States Patent
Philhower

(10) Patent No.: US 11,442,483 B2
(45) Date of Patent: Sep. 13, 2022

(54) FUEL CELL POWER PLANT WITH REAL AND REACTIVE POWER MODES

(71) Applicant: DOOSAN FUEL CELL AMERICA, INC., South Windsor, CT (US)

(72) Inventor: Jason W. Philhower, Glastonbury, CT (US)

(73) Assignee: HYAXIOM, INC., East Hartford, CT (US)

( * ) Notice: Subject to any disclaimer, the term of this patent is extended or adjusted under 35 U.S.C. 154(b) by 159 days.

(21) Appl. No.: 15/060,944

(22) Filed: Mar. 4, 2016

(65) Prior Publication Data
US 2017/0255217 A1  Sep. 7, 2017

(51) Int. Cl.
*G05F 1/70* (2006.01)
*H02J 3/18* (2006.01)
(Continued)

(52) U.S. Cl.
CPC ............ *G05F 1/70* (2013.01); *H01M 8/0494* (2013.01); *H01M 16/003* (2013.01); *H02J 1/00* (2013.01);
(Continued)

(58) Field of Classification Search
CPC ........ H02J 1/14; H02J 3/12; H02J 3/14; H02J 1/00; H02J 3/1842; H02J 3/38;
(Continued)

(56) References Cited

U.S. PATENT DOCUMENTS 6,225,708 B1 * 5/2001 Furukawa ............... G06F 1/305
307/66
6,285,572 B1 * 9/2001 Onizuka ................... H02J 3/46
363/79

(Continued)

FOREIGN PATENT DOCUMENTS

JP      H09233705 A      9/1997
JP      2000014043       1/2000
(Continued)

OTHER PUBLICATIONS

The International Search Report and Written Opinion for PCT Application No. PCT/US2017/018617, dated May 23, 2017.
(Continued)

*Primary Examiner* — Yusef A Ahmed
(74) *Attorney, Agent, or Firm* — Carlson, Gaskey & Olds, P.C.

(57) ABSTRACT

An illustrative example fuel cell power plant includes a cell stack assembly having a plurality of fuel cells configured to generate electricity based on an electrochemical reaction. The power plant includes a capacitor, a plurality of inverters, and at least one controller that is configured to control the plurality of inverters in a first mode and a second mode. The first mode includes the cell stack assembly associated with at least one of the inverters. A cell stack assembly and the associated inverter provide real power to a load external to the fuel cell power plant in the first mode. The second mode includes at least a second one of the inverters associated with the capacitor. The capacitor and the second one of the (Continued)

inverters selectively provide reactive power to or receive reactive power from a grid external to the fuel cell power plant in the second mode.

10 Claims, 2 Drawing Sheets

(51) Int. Cl.
  *H02J 3/38*    (2006.01)
  *H02J 3/46*    (2006.01)
  *H02J 1/00*    (2006.01)
  *H01M 8/04858*  (2016.01)
  *H01M 16/00*   (2006.01)

(52) U.S. Cl.
  CPC ............ *H02J 3/1842* (2013.01); *H02J 3/38* (2013.01); *H02J 3/381* (2013.01); *H02J 3/387* (2013.01); *H02J 3/46* (2013.01); *H01M 2250/10* (2013.01); *H02J 2300/30* (2020.01); *Y02B 90/10* (2013.01)

(58) Field of Classification Search
  CPC .... H02J 3/381; H02J 3/387; H02J 3/46; H02J 2300/30; Y04S 20/222; Y10T 307/469; Y10T 307/461; G05F 1/70; H01M 8/0494; H01M 16/003; H01M 2250/10; Y02B 90/10; Y02E 40/20; Y02E 60/50
  USPC .................................. 307/38, 39, 42, 82, 80
  See application file for complete search history.

(56) References Cited

U.S. PATENT DOCUMENTS

| | | | | |
|---|---|---|---|---|
| 6,917,124 | B2* | 7/2005 | Shetler, Jr | H02J 9/061 307/66 |
| 8,263,276 | B1* | 9/2012 | Gurunathan | H02J 3/381 307/64 |
| 10,027,123 | B2 | 7/2018 | Fawzy et al. | |
| 10,873,099 | B1* | 12/2020 | Gurunathan | H02J 7/0027 |
| 2002/0105231 | A1* | 8/2002 | Koeppe | H02J 3/32 307/64 |
| 2003/0025397 | A1* | 2/2003 | Young | H02J 9/062 307/64 |
| 2004/0229095 | A1* | 11/2004 | Pearson | H01M 16/006 429/432 |
| 2006/0057441 | A1* | 3/2006 | Wills | H01M 8/04537 429/430 |
| 2009/0102291 | A1* | 4/2009 | Mazumder | H02J 7/34 307/80 |
| 2009/0223726 | A1* | 9/2009 | Jeon, II | B60K 6/32 180/65.285 |
| 2009/0302691 | A1* | 12/2009 | Wang | H02J 3/38 307/130 |
| 2010/0171472 | A1* | 7/2010 | Angquist | H02J 3/1842 323/207 |
| 2010/0292853 | A1* | 11/2010 | McDonnell | H02J 3/34 700/287 |
| 2011/0133677 | A1* | 6/2011 | Franke | B60L 58/33 318/400.3 |
| 2011/0121060 | A1 | 9/2011 | Selker | |
| 2011/0210606 | A1* | 9/2011 | Selker | H02J 3/387 307/9.1 |
| 2012/0029723 | A1* | 2/2012 | Schugart | H02J 3/32 700/298 |
| 2012/0326504 | A1* | 12/2012 | Ballantine | H02J 3/386 307/65 |
| 2013/0200714 | A1* | 8/2013 | Pan | H02J 3/386 307/82 |
| 2015/0115722 | A1* | 4/2015 | Fawzy | H02J 3/18 307/82 |
| 2016/0072292 | A1* | 3/2016 | Rogers | H02J 3/466 307/62 |
| 2017/0005473 | A1* | 1/2017 | Somani | H02J 3/381 |
| 2017/0358929 | A1* | 12/2017 | Koeppe | H02J 13/00028 |
| 2018/0145511 | A1* | 5/2018 | Biellmann | F01K 3/12 |
| 2018/0326858 | A1* | 11/2018 | Gruber | B60L 58/19 |
| 2019/0204391 | A1* | 7/2019 | Cottuli | H01M 8/04365 |

FOREIGN PATENT DOCUMENTS

| | | |
|---|---|---|
| JP | 2011193685 | 9/2011 |
| JP | 2015039262 A | 2/2015 |
| JP | 2015070654 A | 4/2015 |
| WO | 0221659 | 3/2002 |
| WO | 2004030178 A1 | 4/2004 |
| WO | 2015025712 | 2/2015 |
| WO | 2015056309 | 4/2015 |

OTHER PUBLICATIONS

International Preliminary Report on Patentability for PCT Application No. PCT/US2017/018617, dated Sep. 13, 2018.
Khadem S., et al. Parallel operation of inverters and active power filters in distributed generation system A review, Renewable and Sustainable Energy Reviews, Jun. 24, 2011, pp. 5155-5168, vol. 12, No. 9, New York, NY.
The Extended European Search Report for EP Application No. 17760482.4, dated Jul. 11, 2019.
First Office Action, Chinese Patent Application No. 201780015088.6 dated Jul. 23, 2021.

\* cited by examiner

FUEL CELL POWER PLANT WITH REAL AND REACTIVE POWER MODES

TECHNICAL FIELD

This disclosure generally relates to fuel cell power plants. More particularly, this disclosure relates to a fuel cell power plant having real and reactive power modes.

BACKGROUND

Fuel cells are devices that generate electrical power based on an electrochemical reaction. Fuel cell power plants are known that include a cell stack assembly having a plurality of fuel cells for generating a desired amount of power.

Typical fuel cell power plants generate real power based on the output of the cell stack assembly. It is known, for example, to utilize a set of inverters for providing AC power output based on DC power generated by the cell stack assembly.

To the extent that known fuel cell power plants have reactive power only capabilities, those are typically limited to operating as a static VAR compensator.

SUMMARY

Illustrative example embodiments of this invention include a fuel cell power plant that has the capability of operating in a real power mode and a reactive power mode in which the only power output from the power plant is reactive power.

An illustrative example fuel cell power plant includes a cell stack assembly having a plurality of fuel cells configured to generate electricity based on an electrochemical reaction. The power plant includes a capacitor, a plurality of inverters, and at least one controller that is configured to control the plurality of inverters in a first mode and a second mode. The first mode includes the cell stack assembly associated with at least one of the inverters. The cell stack assembly and the associated inverter provide real power to a load external to the fuel cell power plant in the first mode. The second mode includes at least a second one of the inverters associated with the capacitor to selectively provide reactive power to or receive reactive power from a grid external to the fuel cell power plant.

An illustrative example method of operating a fuel cell power plant includes controlling a plurality of inverters in a first mode and a second mode. A cell stack assembly and at least one associated inverter is used for providing real power to a load external to the fuel cell power plant in the first mode. A capacitor and at least a second one of the inverters is used for selectively providing reactive power to or receiving reactive power from a grid external to the fuel cell power plant in the second mode.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention provide a fuel cell power plant with the ability to generate reactive power as the only output to support a local grid system, for example.

Figure 1:
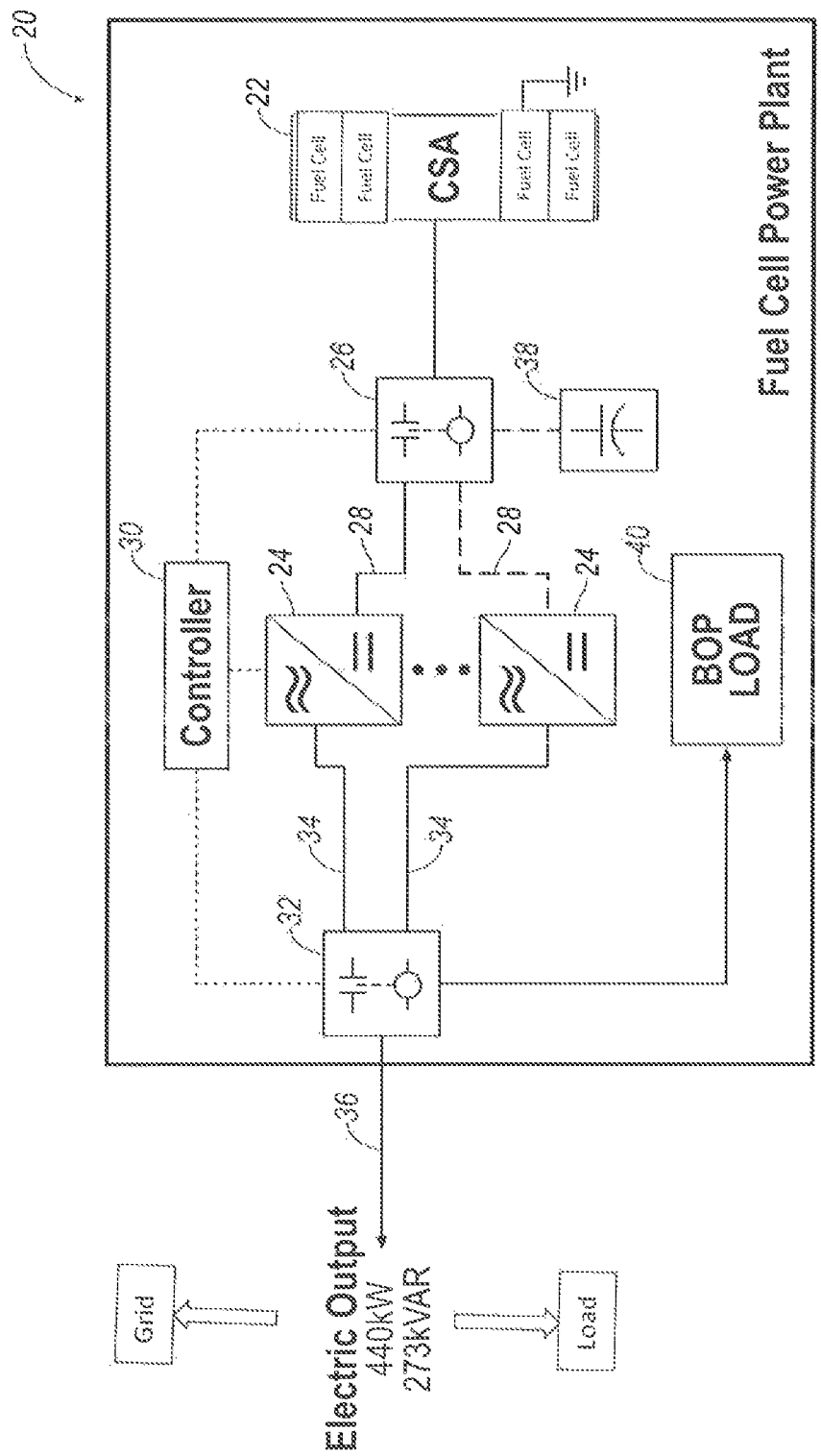
FIG. 1 schematically illustrated selected portions of a fuel cell power plant designed according to an embodiment of this invention operating in a first mode.

FIG. 1 schematically illustrates selected portions of a fuel cell power plant 20. A cell stack assembly (CSA) 22 includes a plurality of fuel cells (not specifically illustrated) that generate electrical power based on an electrochemical reaction. The fuel cells may take a variety of forms. For example, some fuel cells will be phosphoric acid fuel cells while others will be polymer electrolyte membrane fuel cells. Those skilled in the art who have the benefit of this description will be able to select an appropriate type of fuel cell and CSA arrangement to meet their particular needs.

In one example implementation, the fuel cell power plant 20 is a low voltage system because it provides a real power output that is less than 600 kilowatts. Example implementations include a real power output of 480 kilowatts or 440 kilowatts.

A plurality of inverters 24 are included for converting DC electrical power from the CSA 22 into real AC power to be provided to a load external to the fuel cell power plant 20. The illustrated example includes at least one switch 26 for selectively coupling a selected number of the inverters 24 with the CSA 22 over a DC bus 28. A controller 30 controls operation of the switch 26 and the inverters 24 to achieve a desired operation and output from the fuel cell power plant 20. The controller 30 also controls a switch 32 that selectively couples an AC bus 34 associated with the inverters 24 to an output 36 of the fuel cell power plant 20.

The fuel cell power plant 20 also includes a capacitor 38 and a plurality of loads associated with the operation of the fuel cell power plant schematically shown at 40. Example loads included in the schematic representation at 40 include pumps for circulating coolant or reactants and blowers associated with the fuel cell power plant 20.

In FIG. 1, the controller 30 controls operation of the inverters 24 according to a first mode of operation. In this example, the first mode corresponds to a real power mode of the fuel cell power plant 20. When it is desired to provide real AC power at the output 36, the controller 30 operates the switches 26 and 32 to selectively couple the cell stack assembly 22 with one or more of the inverters 24 to provide real AC power output at 36. The controller 30 in this example is programmed to control the inverters using known techniques for providing such power on the output 36. Limited reactive power may be provided in the first mode.

As schematically represented by the dashed lines in FIG. 1, the capacitor 38 is not involved in providing real AC power output at 36. There are times, however, during the first mode of operation when a transient load is experienced by the fuel cell power plant 20. This may occur, for example, when there is a relatively sudden increase in the power demand associated with the load external to the fuel cell power plant 20 or when there is a drop in available power from an external grid associated with the power plant 20. Under such conditions, the controller 30 controls the switch 26 to provide load step transition assistance using power from the capacitor 38. During the first mode of operation the capacitor 38 provides transient load support.

Figure 2:
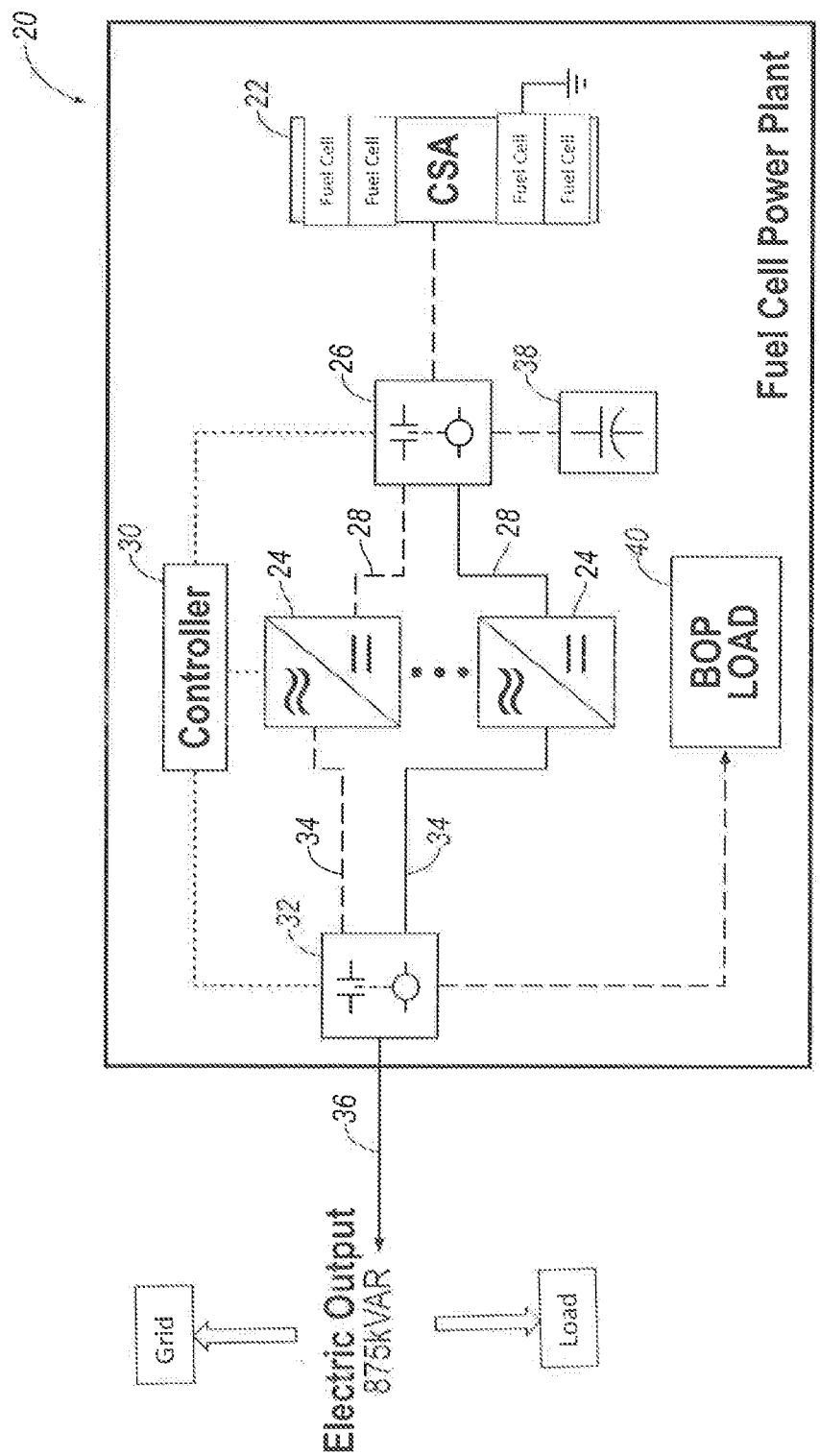
FIG. 2 schematically illustrates the fuel cell power plant of FIG. 1 operating in a second mode.

FIG. 2 schematically illustrates the fuel cell power plant 20 operating in a second mode in which the output at 36 is exclusively reactive power. In the second mode, the controller 30 controls the switches 26 and 32 and the inverters 24 so that at least one of the inverters 24 and the capacitor 38 provide the reactive power output at 36. The CSA 22 is not used for providing any electrical output external to the fuel cell power plant 20 in the second mode. As schematically represented by the dashed lines in FIG. 2, output from the CSA 22 provides power to the loads internal to the fuel cell power plant at 40 during the second mode of operation. In one example, there are seven inverters 24 with a first one of them used in the second mode for providing power from the CSA 22 to the loads at 40. The other six inverters 24 are utilized in association with the capacitor 38 for providing reactive power to or absorbing reactive power from a grid external to the fuel cell power plant 20.

The controller 30 controls operation of the inverters 24 associated with the capacitor 38 in the second mode to provide reactive power output to or to absorb reactive power from a grid external to the fuel cell power plant 20. Under both conditions, the capacitor 38 voltage is controlled by changing the phase angle of the inverters.

In the second mode, the portion of the DC bus 28 associated with the CSA 22 is isolated from the portion of the DC bus 28 associated with the capacitor 38. The controller 30 operates the switch 26 to realize the DC bus isolation. The AC bus 34 is similarly divided into a portion that is operative for providing grid output at 36 and another portion for providing power to the loads at 40. The controller 30 operates the switch 32 to realize such a division of the AC bus 34 to isolate the AC output based on the CSA 22 from the reactive power output based on the capacitor 38.

The inclusion of the capacitor 38 and the control of the inverters 24 and switches 26 and 32 allows for the fuel cell power plant 20 to operate in a first, real power mode and in a second, "reactive power only" mode where the output at 36 from the fuel cell power plant 20 is exclusively reactive power.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell power plant, comprising:
   a cell stack assembly including a plurality of fuel cells configured to generate electricity based on an electrochemical reaction;
   a capacitor;
   a plurality of inverters; and
   at least one controller that is configured to control the plurality of inverters in a first mode and a second mode,
   the first mode including the cell stack assembly associated with a first one of the inverters, the cell stack assembly and the first one of the inverters providing real power to a load external to the fuel cell power plant, wherein the first mode includes the capacitor associated with at least one of the plurality of inverters, and wherein the first mode further includes the capacitor providing supplemental power output from the fuel cell power plant to the load when there is an increase in a load demand on the fuel cell power plant, and
   the second mode including at least a second one of the inverters associated with the capacitor, the second one of the inverters and the capacitor selectively providing reactive power to a grid external to the fuel cell power plant and selectively receiving reactive power from the grid, wherein the reactive power of the second mode is the only power output from the fuel cell power plant that is external to the fuel cell power plant in the second mode, wherein the capacitor and the second one of the inverters are the only source of the reactive power supplied by the fuel cell power plant to the grid external to the fuel cell power plant in the second mode, wherein the capacitor is charged by the reactive power received from the grid in the second mode, wherein the second mode includes at least one of the inverters and the cell stack assembly configured for providing power to at least one other component of the fuel cell power plant, and wherein the controller controls at least one switch to isolate power output of the cell stack assembly from the reactive power output of the second mode.

2. The fuel cell power plant of claim 1, wherein more than one of the plurality of inverters is associated with the capacitor in the second mode.

3. The fuel cell power plant of claim 1, wherein the real power is a low voltage power less than or equal to 600 kilowatts.

4. The fuel cell power plant of claim 1, comprising
   a DC bus between the cell stack assembly and the plurality of inverters; and
   wherein the controller selectively controls the at least one switch to couple the cell stack assembly, the capacitor, and selected ones of the plurality of inverters respectively to the DC bus.

5. The fuel cell power plant of claim 1, comprising
   an output configured to be coupled to the load external to the fuel cell power plant;
   an AC bus between the plurality of inverters and the output; and
   wherein the controller selectively couples selected ones of the plurality of inverters to the output.

6. The fuel cell power plant of claim 1, wherein the cell stack assembly is not used for providing any electrical output external to the fuel cell power plant in the second mode.

7. A method of operating a fuel cell power plant including a cell stack assembly, a capacitor, and a plurality of inverters, the method comprising:
   controlling the plurality of inverters in a first mode and a second mode;
   using the cell stack assembly and a first one of the inverters for providing real power to a load external to the fuel cell power plant in the first mode;
   providing supplemental power output from the fuel cell power plant to the load using the capacitor and at least one of the plurality of inverters associated with the capacitor in the first mode when there is an increase in a load demand on the fuel cell power plant;
   using the capacitor and at least a second one of the inverters for selectively providing reactive power to a grid external to the fuel cell power plant in the second mode, wherein the reactive power of the second mode is the only power output from the fuel cell power plant that is external to the fuel cell power plant in the second mode, wherein the capacitor and the second one of the inverters are the only source of the reactive power supplied by the fuel cell power plant external to the fuel cell power plant in the second mode;
   using the capacitor and at least the second one of the inverters for selectively receiving reactive power from the grid external to the fuel cell power plant in the second mode;

charging the capacitor using the reactive power received from the grid in the second mode;

using the cell stack assembly and at least one of the inverters for providing power to at least one other component of the fuel cell power plant in the second mode; and controlling at least one switch to isolate power output of the cell stack assembly from the reactive power output of the second mode.

8. The method of claim 7, wherein more than one of the plurality of inverters is associated with the capacitor in the second mode.

9. The method of claim 7, wherein the real power is a low voltage power less than or equal to 600 kilowatts.

10. The method of claim 7, wherein the cell stack assembly is not used for providing any electrical output external to the fuel cell power plant in the second mode.

\* \* \* \* \*